United States Patent [19]

Pensa

[11] 4,034,654
[45] July 12, 1977

[54] CONTROL SYSTEMS FOR VARIABLE CAPACITY HYDRAULIC MACHINES

[75] Inventor: Carlo Pensa, Esino Lario, Como, Italy

[73] Assignee: Massey-Ferguson Services N.V., Curacao, Netherlands Antilles

[21] Appl. No.: 632,598

[22] Filed: Nov. 17, 1975

[30] Foreign Application Priority Data
Nov. 18, 1974 United Kingdom ............. 49850/74

[51] Int. Cl.² .................................. F01B 13/04
[52] U.S. Cl. .................................. 91/506; 60/444
[58] Field of Search ................ 60/444; 91/506; 417/212, 218, 222

[56] References Cited

U.S. PATENT DOCUMENTS

| 2,177,098 | 10/1939 | Doe et al. | 91/506 |
| 2,338,021 | 12/1943 | Bennett | 417/212 |
| 2,932,948 | 4/1960 | Neff et al. | 417/222 |
| 3,199,286 | 8/1965 | Anderson | 60/444 |
| 3,398,530 | 8/1968 | Prevallet | 60/444 |
| 3,543,515 | 10/1968 | Kempson | 60/445 |
| 3,797,245 | 3/1974 | Hein | 417/212 |
| 3,834,280 | 9/1974 | Jones | 91/505 |
| 3,908,518 | 9/1975 | Bobier | 91/506 |

Primary Examiner—William L. Freeh
Attorney, Agent, or Firm—Thomas P. Lewandowski

[57] ABSTRACT

A transmission having a variable capacity pump and motor is provided with an override device which ensures that the motor is at a maximum capacity, and hence maximum torque capability, prior to operation of other protection devices.

3 Claims, 2 Drawing Figures

CONTROL SYSTEMS FOR VARIABLE CAPACITY HYDRAULIC MACHINES

This invention relates to controls for hydrostatic transmissions comprising a pump and a motor. It is known to provide controls to vary the capacity of both pump and motor to provide a wide range of output speeds from the motor. Regulating devices are also known which operate on the transmission to control it in accordance with a predetermined parameter, i.e., torque, pressure or power consumption. Since the pressure delivered to the pump is primarily determined by the load on the motor and the transmission ratio it is possible when the motor is at a minimum capacity and subjected to high loads for excessive pressures to occur in the system without the regulating device operating. In known transmissions such a condition results in relief valves blowing or the pump being reduced to zero capacity. Thus the transmission is not operating at its maximum capability.

It is an object of the present invention to obviate or mitigate the above disadvantages.

According to the present invention there is provided a hydrostatic transmission comprising a source of pressurised fluid, a variable capacity hydraulic motor connected to said pressure fluid, control means for varying the capacity of said motor, override means operable upon said control means to vary the capacity of said machine; and pressure sensing means for sensing the pressure of said fluid source and operable upon said override means upon attainment of a predetermined pressure to cause said override means to increase the capacity of said motor.

Figure 1:
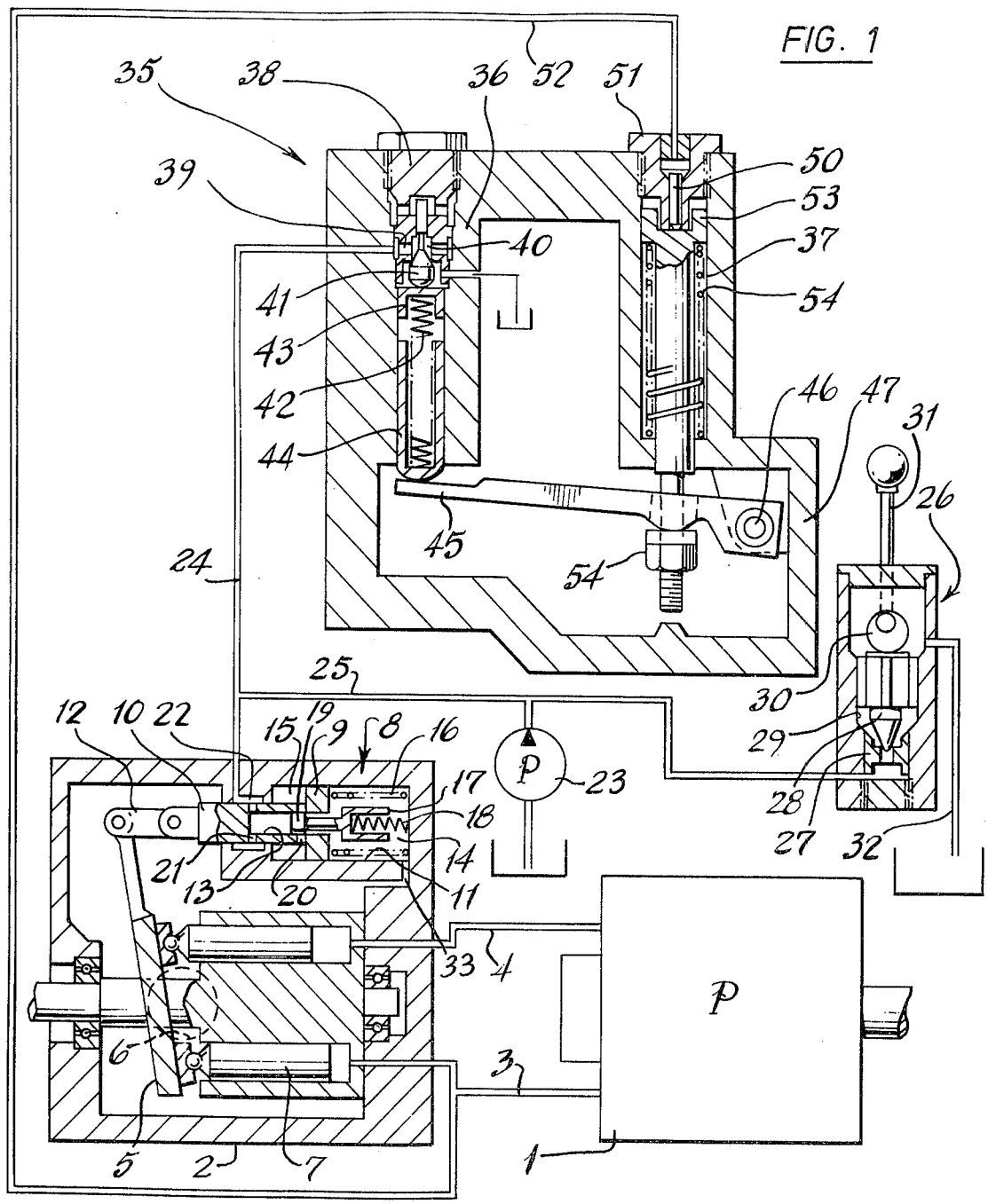
Figure 2:
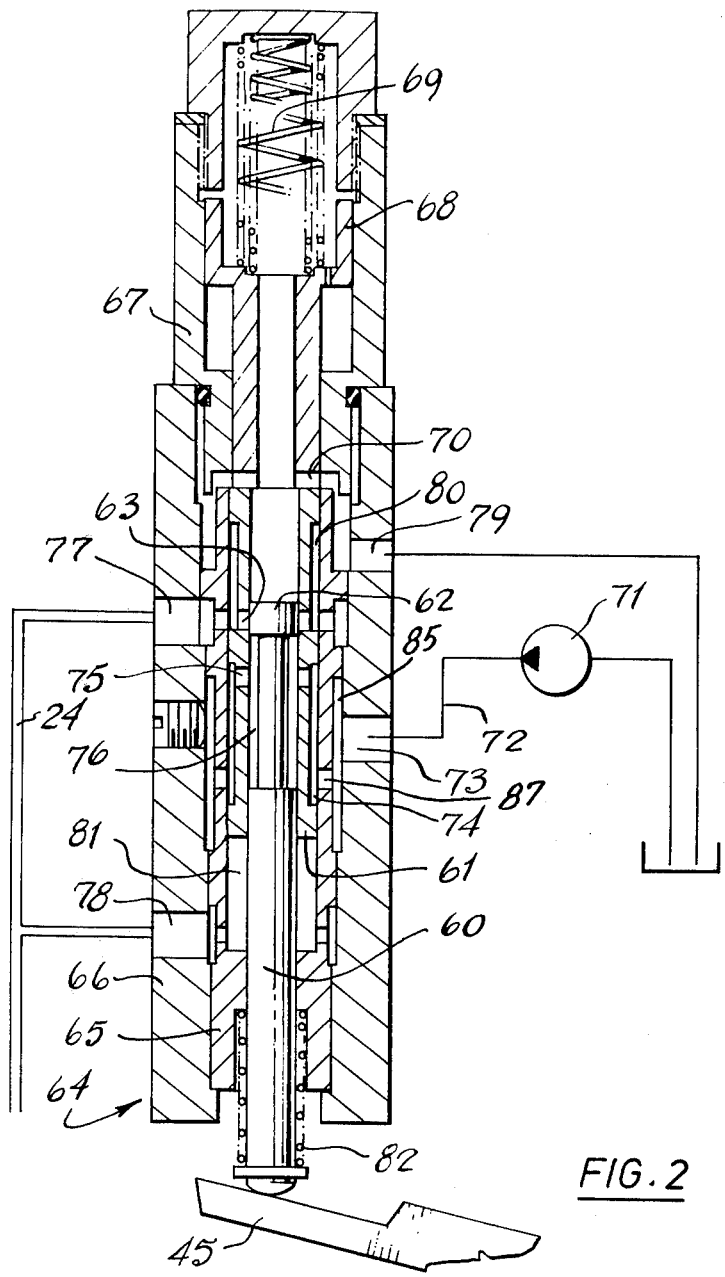

Embodiments of the invention will now be described by way of example only with reference to the accompanying drawings in which FIG. 1 is a diagramatic representation of a control system for a hydrostatic transmission, FIG. 2 is a further embodiment of part of the system shown in FIG. 1.

Referring now to FIG. 1, a hydrostatic transmission comprises a pump 1 and a motor 2 hydraulically connected by conduits 3 and 4. The capacity of the motor 2 may be varied by a swashplate 5 which is pivotally mounted on trunnions 6 and operates to vary the strokes of pistons 7. The inclination of the swashplate 5 may be varied by a servomotor 8 which comprises a piston 9 connected to a piston rod 10 and slidable within a cylinder 11 to divide it into two chambers 14, 15. The piston rod 10 is connected to the swashplate 5 by a link 12. A spring 16 biases the piston 9 in a direction to increase the volume of the chamber 14.

The piston rod 10 is provided with a bore 13 and a spool valve 17 is slidably mounted therein. The spool valve 17 is biased toward the piston 9 by a spring 18 and a land 19 on the spool 17 controls flow to or from the chamber 15 through a cross drilling 20 into the bore 13. A cross drilling 21 in the spool valve 17 connects the bore 13 with a chamber 22 which in turn is connected to a gear pump 23 by way of a conduits 24, 25. The conduit 25 also connects the gear pump 23 to a variable orifice 26 comprising an orifice plate 27, a tapered valve 28 slidably mounted in a bore 29 and an eccentric cam 30 mounted on a manual lever 31 to move the valve 28 along the bore 29 to vary the free area of the orifice. Fluid flowing across the orifice plate 27 flows to the sump through a line 32.

The conduit 24 is connected to an override means, generally designated 35, which comprises a check valve assembly 36 and a pressure sensing means 37.

The check valve assembly 36 comprises a housing 38, having a cross drilling 39 connecting a chamber 40 with the conduit 24. The chamber 40 is sealed by a poppet valve 41 which is biased against its seat by a spring 42 acting between plungers 43, 44. The plunger 44 co-operates with a lever 45 which is pivotally connected by a pin 46 to the casing 47.

The pressure sensing means 37 comprises a piston 50 slidably mounted in a housing 51 connected by way of conduit 52 to the high pressure conduit 3. The piston 50 acts against a plunger 53, movement of which is opposed by a preloaded spring 54. The end of the plunger 53 passes through the lever 45 and nuts 55 are threaded on to the plunger and co-operate with the lever 45.

The operation of the device will now be described. Pressure fluid is supplied by the pump 1 to the high pressure line 3 causing the pistons 7 to move and rotate the motor 2. The speed of rotation of the motor 2 for a given flow rate from the pump 1 is proportional to the inclination of the swashplate 5 which is controlled by the servomotor 8. Movement of the servomotor 8 is controlled by the pressure in the conduit 25. Thus pressure is varied by the variable orifice 26, manipulation of the lever 31 varying the free area of the orifice plate 27 to vary the pressure drop across the orifice plate and hence the pressure in the line 25.

If the pressure in line 25 increases, the spool 17 moves against the spring 18 until the pressure is balanced by the force of the spring 18 and uncovers the cross drilling 20. Fluid can then flow into the chamber 15 through the cross drilling 21 and move the piston 9 against the spring 16 until the land 19 again the cross drilling 20 thereby decreasing the capacity of the motor 5 and increasing the speed of rotation. Similarly, if the pressure in the line 25 drops, the spool 17 moves under the bias of the spring 18 until the spring force is again balanced by the pressure and fluid flows from the chamber 15 to the chamber 14 and to the sump through port 33. The piston 9 is thus moved by the spring 16 and increases the capacity of the motor.

If the motor is at a minimum capacity, the transmission ratio between the pump and motor is high and so high pressures may occur in the conduit 3. To prevent this, the override mechanism 35 is provided. The pressure in the conduit 3 is transmitted to the piston 50 by the line 52. The piston exerts a force on the plunger 53 which is opposed by the preload in the spring 54. At a predetermined pressure, the piston 50 will overcome the spring 54 and cause the plunger to move against the spring force. The lever 45 thus pivots about pin 45 due to the force exerted by the spring 42 and decreases the force exerted by the spring 42 on the poppet valve 41. The pressure in the line 24 overcomes the spring force and opens the poppet valve to vent the line 24 to sump. The pressure in line 24 is thus reduced and the servomotor 8 operates to increase the capacity of the machine, thus increasing the transmission ratio and decreasing the pressure in the conduit 3.

If the pressure then drops in the conduit 3, the plunger 53 moves under the influence of the spring 54 and moves the lever 45 to compress the spring 42 and close the poppet valve 41. The servomotor then operates, due to the increased pressure in line 25, to decrease the motor capacity to its previous value.

FIG. 2 shows a further embodiment of the override device. The check valve assembly 36 is replaced by an assembly with a spool valve 60 which is slidably mounted within a sleeve 61. The spool valve 60 has a land 62 which controls flow through a port 63 in the sleeve 61. The sleeve 61 is itself slidably mounted in a body 64 comprising a barrel 65, an outer casing 66 and an endcap 67. The endcap 67 contains a piston 68 biased so as to abut the sleeve 61 by a spring 69. Grooves 70 are provided in the end of the piston 68.

In this embodiment, control pressure is supplied via the sleeve 61 to the conduit 24. An auxiliary pump may be used. A pump 71 is thus illustrated and supplies oil via a conduit 72 and a gallery 73 in the body 64 to an annular recess 74 in the sleeve 61 via annulas 85 and drilling 87 in the barrel 65. The recess 74 is connected by a cross drilling 75 to an annular recess 76 in the spool 60.

The body 64 is also provided with galleries 77, 78 which are connected to the conduit 24, and gallery 79 which is connected to the sump. The gallery 77 connects the conduit 24 to the port 63 by way of annular chamber 80. The gallery 78 conveys fluid from the conduit 24 to a chamber 81 formed between the barrel 65, the spool 60 and the sleeve 61. The spool 60 is biased against the lever 45 by a spring 82.

The operation of the device will now be described. FIG. 2 illustrates the spool valve assembly with the sleeve 61 positioned for minimum motor capacity. Assuming the orifice 26 (FIG. 1) is then fully opened, i.e. is offering minimum restriction to flow, the pressure in the conduits 24 and 25 will drop and the motor will be at maximum displacement. The sleeve 61 will consequently move along the barrel 65 under the influence of the spring 69 until the piston 68 about the endcap 67. The flow from the pump 71 will pass along the conduit 72 through the gallery 73 into the recesses 85 and 74, through the cross drillings 87 and 75 and into the recess 76. Since the sleeve 61 has moved relative to the spool 60 which has been stationary, the port 63 is uncovered and fluid can flow from the recess 76 into the gallery 77 via chamber 80 and into the conduits 24 and 25 to cross the orifice 26 to sump.

If the free area of the orifice 26 is now reduced, the pressure in the conduits 24 and 25 will rise, (reducing the motor capacity) and the pressure act on the chamber 81 to move the sleeve 61 along the barrel 65 until the pressure in the chamber 81 is matched by the force of the spring 69. At minimum motor capacity (i.e. the free area of the orifice 26 is at a minimum) the sleeve returns to the illustrated position and the port 63 is covered by the land 62 to prevent fluid from passing from the pump 71 into the conduit 24.

If the pressure in the conduit 3 (FIG. 1) rises above a predetermined value then the plunger 50 will move the lever 45 about its pivot and allow the spool 60 (FIG. 2) to move along the sleeve 61 under the influence of the spring 82.

With the motor at minimum capacity movement of spool 60 will cause the land 62 to uncover the port 63 and allows fluid to flow from the line 24 through the port 63, through the grooves 70 and the port 79 to sump. The drop in the pressure line 24 will allow the capacity of the motor to be increased and allow the sleeve 61 to move down the barrel 65 until the port 63 is once again covered by the land 62. If the pressure in the conduit 3 then drops the spool will be moved upward by the lever 45 to allow fluid to flow through the port 63 to the conduit 24.

Should the motor capacity be at any other value than a minimum, then the pressure in conduit 3 will continue to increase until the spool 60 is aligned with the port 63. Any further increase in pressure will allow fluid to flow from the conduit 24 to sump to increase the capacity of the motor. It will be seen therefore that there is a unique pressure at which the motor servo is overriden for each setting of the motor. This is particularly useful since it enables maximum utilisation of the engine power by ensuring that the maximum torque available from the transmission is applied to the output shaft before relief valves or other pump protection devices come into operation.

It will be understood that the pump 1 has been shown diagrammatically and may include any known regulating device and control device. The control device of the pump may be operated by the lever 31 to provide sequential operation of pump and motor in any known manner if desired.

What we claim is:

1. A hydrostatic transmission comprising a source of pressurised fluid, a variable capacity hydraulic motor connected to said pressure fluid; control means for varying the capacity of said motor including a source of pressurized fluid, a control line and means for varying the pressure in said control line; override means operable upon said control means to vary the capacity of said motor including means for venting said control line, a check valve positioned in said control line and biased in a closed direction and link means operable to vary said bias; and pressure sensing means for sensing the pressure of said fluid source and operable upon said override means upon attainment of a predetermined pressure to cause said override means to increase the capacity of said motor.

2. The transmission of claim 1 wherein said link means is connected to a piston and cylinder device which in turn is hydraulically connected to said source of pressurised fluid.

3. A hydrostatic transmission comprising a source of pressurised fluid, a variable capacity hydraulic motor connected to said pressure fluid; control means for varying the capacity of said motor including a source of pressurised fluid, a control line and means for varying the pressure in said control line; override means operable upon said control means to vary the capacity of said motor including means for venting said control line, a spool valve, a sleeve encompassing said spool and slidably mounted within a body, said sleeve being biased for movement in one direction by spring means and in the other direction by pressure in said control line, said spool and said sleeve cooperating to control flow to and from said control line, movement of said spool being controlled by link means connected to a pressure sensing device and movable upon attainment of a predetermined pressure to move said spool and allow flow from said control line; and pressure sensing means for sensing the pressure of said fluid source and operable upon said override means upon attainment of a predetermined pressure to cause said override means to increase the capacity of said motor.

* * * * *